Aug. 25, 1931.  M. ALLAND  1,820,421
INDICATOR FOR CAMERAS
Filed April 16, 1929
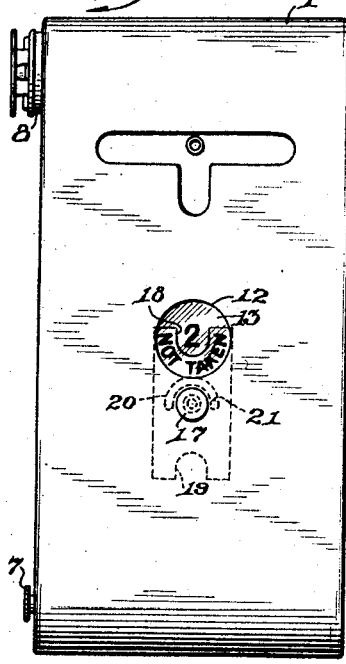
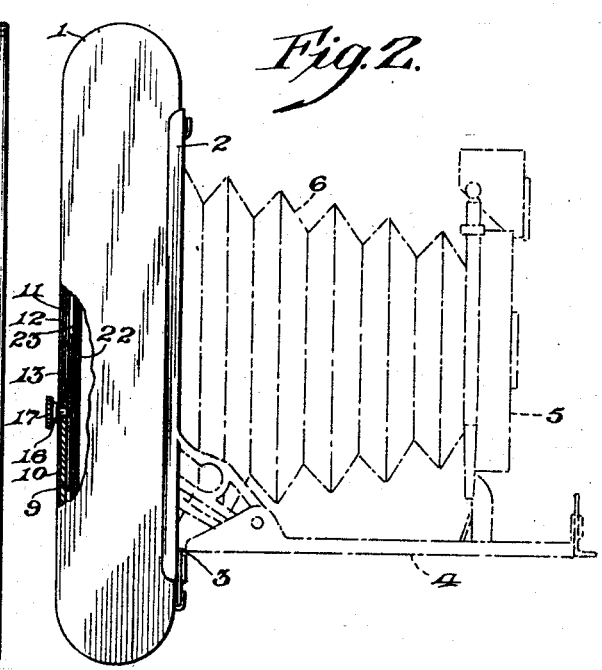
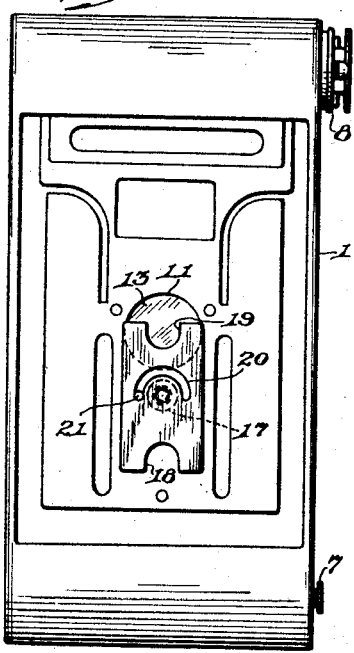
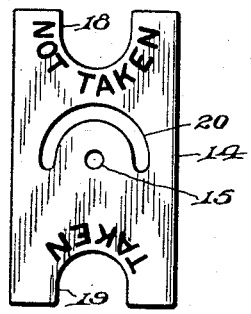
Inventor
Maurice Alland
by J. Stuart Freeman
Attorney Patented Aug. 25, 1931

1,820,421

UNITED STATES PATENT OFFICE

MAURICE ALLAND, OF ATLANTIC CITY, NEW JERSEY

INDICATOR FOR CAMERAS

Application filed April 16, 1929. Serial No. 355,604.

The object of the invention is to provide improvements in means which are adapted, when rightly and consistently used, to lessen and in fact minimize the quantity of film which is being wasted by the average amateur in taking photographs.

As is well known, most of the film cameras employ rolls of sensitized film, upon which consecutive exposures are made, slightly spaced apart and in regular sequence. Frequently, however, the operator forgets that he has advanced the film ready for another exposure, and hastily advances the film again before making the proposed exposure, or taking a picture, as it is commonly called. This is wasteful in that one or more available sections of film are passed over, and upon being developed the film shows corresponding blank spaces, as the distance between such spaces is regulated by the numerals upon the opaque backing strip, which appear through the usual red window in the kodak casing.

On the other hand, it is not only wasteful but extremely disappointing and discouraging after one has taken a picture upon one section of the film to find upon its proper chemical development that a second picture has been accidentally superimposed upon the first, with the result that neither is worth anything, and the opportunity of recording a particular group of friends or a valuable scene has passed forever. This unfortunate situation arises from the fact that, after a first exposure has been made upon the sensitized film, a second such exposure is made upon the assumption or false recollection that the film had previously been advanced the proper distance. It is to obviate the frequency and ease with which such "blanks" and "double exposures" occur that the present invention has been perfected.

Having these facts in mind, the invention comprises details of construction and operation which are fully brought out in the following description, when read in conjunction with the accompanying drawings, in which Fig. 1 is a rear elevation of a well-known form of camera; Fig. 2 is a side elevation of the same; Fig. 3 is an inside view of the camera with the front removed and showing the inner side of the rear wall in elevation; and Fig. 4 is an enlarged elevational view of the improved indicating means per se.

Referring to the drawings, any desired form of camera is illustrated as comprising a casing 1, having a frontal closure 2, pivoted at 3, and when lowered into the dot-and-dash position 4 shown in Fig. 2, comprising a support for a lens carrier 5, which is connected with said casing 1 by means of a bellows pleated opaque member 6. In Fig. 2 the camera is represented by the dot-and-dash lines in operative position for taking exposures or pictures while in Fig. 1 is shown the rear view of the camera in either closed and inoperative, or in open and operative, position. The camera is also provided with the usual film-supporting spools represented by the laterally extending knobs 7 and 8, and the film being normally wound from the spool 7 upon the spool 8, after its successive exposure areas have passed through the exposure position.

The rear wall 9, like the rest of the casing 1, is covered by a layer of suitable material 10 and both wall and covering are provided with aligned apertures 11 and 12 respectively, while spanning said apertures and positioned between said wall and its covering is a glass or other suitable transparent window closure 13, this closure being usually a shade of red or orange in order to protect the sensitized film within the casing from being affected by light upon the exterior of the casing.

Upon the inner surface of the wall 9 there is positioned a plate 14 (shown per se in Fig. 4), having a central aperture 15 into which is secured the inner end 16 of a knob, the head 17 of which is positioned upon the outer surface of the wall covering 10, said knob extending through a suitable aperture in said wall. Said plate in its opposite ends is provided with cutout portions 18 and 19, adjacent to which are positioned any suitable indicia as for instance the words "Not taken" and "Taken" or "Unexposed" and "Exposed", or otherwise, as may be suitable and desirable. The central portion of said plate is also provided with a preferably semi-circular slot 20, through which extends a lug 21, carried by the camera wall 9 in order to limit the oscillatable movement of said plate in opposite directions, so that either one end or the other of said plate may be brought into visual alignment with the aligned wall and cover apertures 11 and 12 as indicated in Fig. 1, merely by manually rotating the head 17 of the knob.

Thus, as indicated in the drawings, the operatively positioned sensitized film surface 22 within the camera casing corresponding with the numeral "2" upon the opaque backing sheet 23 has not been exposed to rays of light passing through the lens carried by the holder 5. However, immediately upon actuating the shutter (not shown) also carried by said lens holder to expose said film area, the knob head 17 is rotated manually as far as the lug 21 will permit it, until the word "Taken" or equivalent indicia appears operatively positioned with respect to the numeral "2" through the transparent aperture closure 13. Then, after the film has been advanced by rotating the spool 8 until the next area of the sensitized film has reached its operative position, as indicated by the numeral "3" appearing through the closure 13, said plate by means of said knob is again rotated in the opposite direction until the "Not taken" or equivalent indicia again appears through said aperture closure.

While only one form of the invention has been described, it is to be understood that so far as is known, the indication of whether or not a film has been exposed is new, so that the claims hereto appended have been worded so as to anticipate an infinite number of other constructions which might produce the same or similar result.

This invention makes it possible to put the camera away, either for a short, or in fact for any period, so that upon again picking up the camera one is at once apprised of the exact exposed or unexposed condition of the film area corresponding with the numeral then found showing through the window, and with this information can then operate the camera without possibility of making any mistake whatever.

Having thus described my invention, what I claim and desire to protect by Letters Patent of the United States is:—

1. The combination of a camera, having an aperture and adapted to contain sensitized film associated with indicia corresponding with exposure-receiving areas of said film, with a pivoted oscillatable plate carried by the camera and also visible through said aperture simultaneously with and in addition to said indicia, to indicate by its position with respect to said camera whether the operatively positioned exposure area represented by the neighboring indicia has been exposed or not.

2. The combination of a camera, having an aperture and adapted to contain sensitized film associated with indicia corresponding with exposure-receiving areas of said film, with a plate also visible through said aperture simultaneously with said indicia and partially surrounding the position normally occupied by said indicia, to indicate in association with said indicia whether the operatively positioned exposure area has been exposed or not.

3. The combination of a camera, having an aperture and adapted to contain sensitized film associated with indicia corresponding with exposure-receiving areas of said film, with a plate pivotally carried by and within the camera and having a portion visible through a wall of the camera simultaneously with said indicia and operative to indicate whether the operatively positioned exposure area has been exposed or not, and a lug carried by said plate and extending through said wall to permit manual operation of said plate.

In testimony whereof I have affixed my signature.

MAURICE ALLAND.